(12) United States Patent
Kaneda et al.

(10) Patent No.: US 6,979,701 B2
(45) Date of Patent: Dec. 27, 2005

(54) THERMOPLASTIC POLYURETHANE FOAM, PROCESS FOR PRODUCTION THEREOF AND POLISHING PADS MADE OF THE FOAM

(75) Inventors: Shunji Kaneda, Okayama (JP); Chihiro Okamoto, Osaka (JP)

(73) Assignee: Kuraray Co., Ltd., Kurashiki (JP)

( * ) Notice: Subject to any disclaimer, the term of this patent is extended or adjusted under 35 U.S.C. 154(b) by 126 days.

(21) Appl. No.: 10/432,629

(22) PCT Filed: Dec. 5, 2001

(86) PCT No.: PCT/JP01/10613
§ 371 (c)(1), (2), (4) Date: Jun. 9, 2003

(87) PCT Pub. No.: WO02/46283
PCT Pub. Date: Jun. 13, 2002

(65) Prior Publication Data
US 2004/0054023 A1 Mar. 18, 2004

(30) Foreign Application Priority Data
Dec. 8, 2000 (JP) .......................................... 2000-374134
Apr. 12, 2001 (JP) .......................................... 2001-113465

(51) Int. Cl.$^7$ .............................................. C08G 18/06
(52) U.S. Cl. ........................ 521/170; 521/128; 521/130; 521/163; 521/174
(58) Field of Search ................................ 521/128, 130, 521/163, 170, 174

(56) References Cited

U.S. PATENT DOCUMENTS 6,239,188 B1 * 5/2001 Kihara et al. ................ 521/159
6,777,455 B2 * 8/2004 Seyanagi et al. ........... 521/110

FOREIGN PATENT DOCUMENTS

| JP | 8-113664 | 5/1996 |
| JP | 11-349680 | 12/1999 |
| JP | 2001-261874 | 9/2001 |

* cited by examiner

*Primary Examiner*—John M. Cooney, Jr.
(74) *Attorney, Agent, or Firm*—Oblon, Spivak, McClelland, Maier & Neustadt, P.C.

(57) ABSTRACT

The present invention aims to provide a polyurethane foam, suitably usable as a polishing pad, having a uniform foam structure, which can achieve the improvements in the flatness of the surface of polished materials and in the planarization efficiency, and can extend the polishing pad life longer than that of the conventional polyurethane foams. This aim can be achieved by providing a polyurethane foam having a density of 0.5 to 1.0 g/cm$^3$, a cell size of 5 to 200 $\mu$m and a hardness [JIS-C hardness] of not less than 90, comprising a thermoplastic polyurethane which is obtained by a reaction of a high polymer polyol, an organic diisocyanate and a chain extender, contains not less than 6% by weight of a nitrogen atom derived from the isocyanate group, and has a storage elastic modulus measured at 50° C. [E'$_{50}$] of not less than 5×10$^9$ dyn/cm$^2$.

16 Claims, No Drawings

THERMOPLASTIC POLYURETHANE FOAM, PROCESS FOR PRODUCTION THEREOF AND POLISHING PADS MADE OF THE FOAM

TECHNICAL FIELD

The present invention relates to a polyurethane foam having a uniform foam structure, a production process thereof and a polishing pad made of the foam. The polishing pad of the present invention is useful for polishing application for polishing semiconductor wafers and the like with high accuracy and high efficiency.

BACKGROUND ART

As a polishing pad used for mirror finish of a semiconductor wafer, which is a base material for an integrated circuit, there has been frequently used, in general, a velour-like or suede-like composite material of a fiber and a resin, or a relatively flexible sheet having large compressibility prepared by impregnating a nonwoven fabric with a thermoplastic polyurethane resin and wet coagulating it.

With a recent trend toward the high integration and the multilevel interconnection, demands for a semiconductor wafer which is improved in quality such as higher flatness and which is lower priced have been increasing. Accordingly, polishing pads are also required to have higher performances such as better planarization capability than ever and to be usable for a longer time.

With respect to such a requirement, conventional nonwoven fabric type polishing pads, which are relatively flexible, show good contact with a wafer and good retention of a polishing slurry. However, because of the flexibility, they are not sufficient in the planarization of the polished surface of a wafer. In addition, the voids of the nonwoven fabric may be clogged with the polishing slurry and polishing wastes, which tends to cause the wafer surface to be susceptible to scratches. Further, the polishing slurry and the polishing waste easily penetrate deeply into the voids, which makes it difficult to brush the polishing pad, and which is the cause of the problem that the polishing pad life may be short.

On the other hand, a polishing pad using a polymer foam is also known, and is commonly used for applications, in which planarization is required, such as polishing of wafers, because of its higher rigidity than that of nonwoven fabric type polishing pads. In addition, because the polishing pad using a polymer foam has closed-cell structure, the polishing slurry and the polishing wastes do not penetrate deeply into the voids as with the nonwoven fabric type polishing pad. Therefore, the polishing pad using a polymer foam is relatively easy to dress, and hence it can stand the long-time use. In particular, a polyurethane foam is commonly used as a polymer foam, because of an excellent abrasion resistance.

The polishing pad made of a polyurethane foam is produced, in general, by appropriately grinding or slicing a polyurethane foam. Conventional polyurethane foams for a polishing pad has been produced by foam casting and curing of a two-part type curable polyurethane [see Japanese Patent Application Laid-open Nos. 2000-178374, 2000-248034, 2001-89548, Hei 11-322878, etc.]. However, with this production method, it is difficult to effect the uniform reaction and foaming, and in addition, there is a limit on the increase in hardness of the resulting polyurethane foam. Further, conventional polishing pads made of a polyurethane foam may vary in polishing performance such as the flatness of the polished surface of a wafer and the planarization efficiency. The variation in foam structure of the polyurethane foam, which is the base material, is considered to be a cause of such a problem. Besides, polishing pads with higher hardness are demanded in order to improve the planarization efficiency [see "SCIENCE OF CMP" issued by Science Forum Inc., on Aug. 20, 1997].

DISCLOSURE OF THE INVENTION

Under these circumstances, the present invention has been completed. It is therefore an object of the present invention to provide a polyurethane foam having a uniform foam structure, which is useful as a polishing pad capable of achieving the improvements in the flatness of the surface of polished materials and in the planarization efficiency, and capable of extending the polishing pad life longer than that of the conventional polyurethane foams.

The present inventors have made intensive studies to achieve the above-described object and found that a polyurethane foam having high hardness, and a fine and uniform foam structure can be obtained by foaming a specific thermoplastic polyurethane in which a non-reactive gas has been dissolved. Thus, the present invention has been completed.

Namely, the present invention provides a polyurethane foam having a density of 0.5 to 1.0 g/cm$^3$, a cell size of 5 to 200 μm and a hardness [JIS-C hardness] of not less than 90, comprising a thermoplastic polyurethane which is obtained by a reaction of a high polymer polyol, an organic diisocyanate and a chain extender, contains not less than 6% by weight of a nitrogen atom derived from the isocyanate group, and has a storage elastic modulus measured at 50° C. [$E'_{50}$] of not less than $5\times10^9$ dyn/cm$^2$.

The present invention also provides a polyurethane foam having a density of 0.5 to 1.0 g/cm$^3$ and a cell size of 5 to 200 μm, obtained by dissolving a non-reactive gas in the above-described thermoplastic polyurethane under a pressurized condition, then releasing the pressure to effect the foaming of the polyurethane at a temperature of not less than the softening temperature thereof.

In addition, the present invention provides a polishing pad made of such a polyurethane foam.

Further, the present invention provides a process for producing a polyurethane foam, which comprises the steps of dissolving a non-reactive gas in a molded product of the above-described thermoplastic polyurethane under the conditions of a pressure of 3 to 15 MPa and a temperature of 50 to 160° C. in a pressure vessel; releasing the pressure of the pressure vessel at a temperature lower than the softening temperature of the thermoplastic polyurethane; and heating the molded product, in which the non-reactive gas is dissolved, to a temperature of not less than the softening temperature of the thermoplastic polyurethane to effect the foaming of the molded product. Hereinafter, this process may be referred to as "Production process 1".

Furthermore, the present invention provides a process for producing a polyurethane foam, which comprises the steps of dissolving a non-reactive gas in a molded product of the above-described thermoplastic polyurethane under the conditions of a pressure of 3 to 15 MPa and a temperature of 160 to 200° C. in a pressure vessel; and releasing the pressure of the pressure vessel to effect the foaming of the molded product, in which the non-reactive gas is dissolved. Hereinafter, this process may be referred to as "Production process 2".

Still further, the present invention provides a process for producing a polyurethane foam having a density of 0.5 to 1.0 g/cm$^3$ and a cell size of 5 to 200 μm, which comprises the steps of dissolving a non-reactive gas in the above-described thermoplastic polyurethane at a molten state under a pressurized condition; and subjecting the thermoplastic polyurethane, in which the non-reactive gas is dissolved, to extrusion molding or injection molding under the stock pressure allowing the foaming of said polyurethane to give a foamed molded product. Hereinafter, this process may be referred to as "Production process 3".

Moreover, the present invention provides a process for producing a polyurethane foam having a density of 0.5 to 1.0 g/cm$^3$ and a cell size of 5 to 200 µm, which comprises the steps of dissolving a non-reactive gas in the above-described thermoplastic polyurethane at a molten state under a pressurized condition; subjecting the thermoplastic polyurethane, in which the non-reactive gas is dissolved, to injection molding at a speed such that the stock pressure can be kept within the range under which the foaming is not effected, to give a unfoamed molded product; and heating the unfoamed molded product to a temperature of not less than the softening temperature of the thermoplastic polyurethane to effect the foaming of the molded product. Hereinafter, this process may be referred to as "Production process 4".

In addition, the present invention provides a process for producing a polyurethane foam having a density of 0.5 to 1.0 g/cm$^3$ and a cell size of 5 to 200 µm which comprises the steps of dissolving a non-reactive gas in the above-described thermoplastic polyurethane at a molten state under a pressurized condition; injecting the thermoplastic polyurethane, in which the non-reactive gas is dissolved, into a mold at a speed such that the stock pressure can be kept within the range under which the foaming is not effected; and increasing the mold cavity to give a foamed molded product. Hereinafter, this process may be referred to as "Production process 5".

BEST MODE FOR CARRYING OUT THE INVENTION

The polyurethane used in the present invention can be prepared by a reaction of a high polymer diol, an organic diisocyanate and a chain extender.

The high polymer diol includes, for example, polyether diols, polyester diols and polycarbonate diols. One or more of these high polymer diols can be used. Among them, preferred are polyether diols.

The polyether diols can include, for example, a poly (ethylene glycol), a poly(propylene glycol), a poly (tetramethylene glycol) and a poly(methyltetramethylene glycol). One or more of these polyether diols can be used. Among them, preferred is a poly(tetramethylene glycol).

The polyester diols can be prepared, for example, by subjecting a diol having a low molecular weight and a dicarboxylic acid or an ester forming derivative thereof such as an ester derivative or an anhydride, to esterification or ester exchange, according to the conventional methods.

The dicarboxylic acid, which constitutes the polyester diols, can include aliphatic dicarboxylic acids having 4 to 12 carbon atoms such as succinic acid, glutaric acid, adipic acid, pimelic acid, suberic acid, azelaic acid, sebacic acid, dodecane dicarboxylic acid, 2-methylsuccinic acid, 2-methyladipic acid, 3-methyladipic acid, 3-methylpenetane dicarboxylic acid, 2-methyloctane dicarboxylic acid, 3,8-dimethyldecane dicarboxylic acid and 3,7-dimethyldecane dicarboxylic acid; aromatic dicarboxylic acids such as terephthalic acid, isophthalic acid and orthophthalic acid; etc. One or more of these dicarboxylic acids can be used.

The diol having low molecular weight, which constitutes the polyester diols, can include aliphatic diols such as ethylene glycol, 1,3-propanediol, 2-methyl-1,3-propanediol, 1,4-butanediol, neopentylglycol, 1,5-pentanediol, 3-methyl-1,5-pentanediol, 1,6-hexanediol, 1,8-octanediol, 2-methyl-1,8-octanediol, 1,9-nonanediol and 1,10-decanediol; cycloaliphatic diols such as cyclohexanedimethanol and cyclohexanediol; etc. One or more of these diols can be used.

The polycarbonate diols can include those obtained by the reaction of a diol having a low molecular weight and a carbonate compound such as a dialkyl carbonate and an alkylene carbonate. The diols having a low molecular weight, which constitutes the polycarbonate diols, can include ones illustrated above as a diol constituting the polyester diols. The dialkyl carbonate can include, for example, dimethyl carbonate and diethyl carbonate. Examples of the alkylene carbonate can include ethylene carbonate.

The number average molecular weight of a high polymer diol falls preferably within the range of 400 to 2000, and more preferably within the range of 500 to 1500. By using a high polymer diol having a number average molecular weight within this range, it is possible to produce effectively a thermoplastic polyurethane with high hardness. When the number average molecular weight of the high polymer diol exceeds 2000, during molding by extrusion molding or injection molding, the viscosity increase may occur in a molding machine, which results a formation of a unmelted matter. This may involve the interruption of the molding operation and the purge of the inside of the molding machine. On the other hand, when the number average molecular weight of the high polymer diol is less than 400, the abrasion resistance of the resulting polyurethane foam tends to be reduced. Here, the number average molecular weight of a high polymer diol referred in this specification means the number average molecular weight calculated based on the hydroxyl value which is determined according to JIS K-1577.

The organic diisocyanate used for the preparation of the thermoplastic polyurethane can include ones conventionally used for the preparation of a thermoplastic polyurethane. Examples of the organic diisocyanate include 4,4'-diphenylmethane diisocyanate, toluylene diisocyanate, phenylene diisocyanate, xylylene diisocyanate, hexamethylene diisocyanate, isophorone diisocyanate, 1,5-naphtylene diisocyanate, 4,4-dicyclohexylmethane diisocyanate and the like. One or more of these organic diisocyanates can be used. Among them, preferred is 4,4'-diphenylmethane diisocyanate, from the viewpoint of the abrasion resistance of the resulting polyurethane foam.

The chain extender used for the preparation of the thermoplastic polyurethane can include ones conventionally used for the preparation of a thermoplastic polyurethane. Preferred chain extender is a compound having a molecular weight of not more than 300 and having two or more active hydrogen atoms capable of reacting with isocyanate group. Examples of the chain extender can include diols such as ethylene glycol, propylene glycol, 1,4-butanediol, 1,6-hexanediol, 3-methyl-1,5-pentanediol, 1,4-bis (β-hydroxyethoxy)benzene, 1,4-cyclohexanediol, bis (β-hydroxyethyl) terephthalate and 1,9-nonanediol. One or more of these chain extenders can be used.

The polyurethane foam of the present invention can be produced by the foaming of a thermoplastic polyurethane which can be obtained by a reaction of a high polymer diol, an organic diisocyanate and a chain extender, and contains not less than 6% by weight of a nitrogen atom derived from the isocyanate group. The polyurethane foam of the present invention has the density of 0.5 to 1.0 g/cm³, the cell size of 5 to 200 μm and the hardness [JIS-C hardness] of not less than 90. When the density of the polyurethane foam is less than 0.5 g/cm³, the foam is too flexible. Accordingly, the flatness of the surface of polished materials is reduced, and the polishing efficiency is also reduced. On the other hand, when the density of the polyurethane foam is larger than 1.0 g/cm³, the polishing efficiency is reduced. The density of the polyurethane foam preferably falls within the range of 0.65 to 0.85 g/cm³ from the viewpoint of the flatness of the surface of polished materials.

In addition, if the cell size of the polyurethane foam is less than 5 μm, the voids of the foam tends to be clogged with the polishing agents contained in the polishing slurry, which may reduce the polishing efficiency and cause a polishing defects such as scratches. On the other hand, if the cell size of the polyurethane foam is larger than 200 μm, the surface smoothness of the foam is reduced, which may cause the localization of the polishing agents, and may cause the polishing defects such as scratches and orange peel flaws. The cell size of the polyurethane foam falls preferably within the range of 20 to 180 μm, and more preferably within the range of 20 to 150 μm from the viewpoint of the retention of the polishing agents.

When the hardness [JIS-C hardness] of the polyurethane foam is lower than 90, the object of the present invention cannot be achieved because the polishing efficiency is not improved. The hardness [JIS-C hardness] of the polyurethane foam is preferably not less than 95, and more preferably not less than 97.

In order to produce a polyurethane foam having above-described density, cell size and hardness, the thermoplastic polyurethane should contain not less than 6% by weight of a nitrogen atom derived from the isocyanate group. From the viewpoint of the hardness and the abrasion resistance of the resulting polyurethane foam, the thermoplastic polyurethane contains preferably 6 to 8.2% by weight, and more preferably 6.5 to 7.5% by weight, of a nitrogen atom derived from the isocyanate group. When a thermoplastic polyurethane containing less than 6% by weight of a nitrogen atom derived from the isocyanate group is used, it is impossible to produce a polyurethane foam having the above-described density, the above-described cell size and the above-described hardness, because the hardness of the thermoplastic polyurethane itself is too low.

A larger number of cells present in the surface of the foam is better for the improvement of the polishing efficiency. However, in general, the increase in number of cells reduces the density of the foam, resulting in a reduction of the hardness of the foam. Accordingly, the polishing efficiency tends to be reduced. In the present invention, the improvement of the polishing efficiency is achieved by increasing the hardness of the polyurethane constituting the foam, which can prevent the reduction in hardness of the foam upon increasing the number of cells.

In addition, the thermoplastic polyurethane should have a storage elastic modulus measured at 50° C. [E′$_{50}$] of not less than 5×10⁹ dyn/cm², in order to produce a polyurethane foam having above-described density, cell size and hardness. When a thermoplastic polyurethane having a storage elastic modulus measured at 50° C. [E′$_{50}$] of less than 5×10⁹ dyn/cm² is used, it is impossible to produce a polyurethane foam having the above-described density, the above-described cell size and the above-described hardness, because the hardness of the thermoplastic polyurethane itself is too low. The thermoplastic polyurethane has preferably a storage elastic modulus measured at 50° C. [E′$_{50}$] of not less than 9×10⁹ dyn/cm².

The ratio [E′$_0$/E′$_{50}$] of the storage elastic modulus of the thermoplastic polyurethane measured at 0° C. [E′$_0$] based on the storage elastic modulus measured at 50° C. [E′$_{50}$] is preferably not more than 1.8. The thermoplastic polyurethane satisfying such a condition has a small temperature dependence of its own hardness. Therefore, the hardness of the polyurethane foam also has a small temperature dependence. As a result, the reduction in the flatness of the surface of polished materials during the polishing operation and the reduction in the polishing efficiency are suppressed. The ratio [E′$_0$/E′$_{50}$] of the storage elastic modulus of the thermoplastic polyurethane measured at 0° C. [E′$_0$] based on the storage elastic modulus measured at 50° C. [E′$_{50}$] is more preferably not more than 1.5.

Further, the melting peak temperature of the thermoplastic polyurethane is preferably not more than 200° C. By using the thermoplastic polyurethane having a melting peak temperature of not more than 200° C., it is possible to produce a polyurethane foam having no defective portion in the inside, and having a uniform foam structure with ease.

The amounts of the above described components, which constitute the thermoplastic polyurethane, is determined according to the abrasion resistance, the desired properties of the resulting thermoplastic polyurethane, and so on. Each component is preferably used in an amount where the isocyanate group of the organic diisocyanate is present at a ratio of 0.95 to 1.3 moles based on 1 mole of the total active hydrogen atoms of the high polymer diol and the chain extender. When the isocyanate group of the organic diisocyanate is present at a ratio of lower than 0.95 moles based on 1 mole of the total active hydrogen atoms, the mechanical strength and the abrasion resistance of the resulting polyurethane foam is reduced. On the other hand, when the isocyanate group of the organic diisocyanate is present at a ratio of higher than 1.3 moles based on 1 mole of the total active hydrogen atoms, the productivity and the storage stability of the thermoplastic polyurethane tends to be reduced.

The thermoplastic polyurethane can be prepared from the above-described three components according to the conventional urethane forming technics. The thermoplastic polyurethane can be prepared by either "prepolymer process" or "one-shot process". The thermoplastic polyurethane is preferably prepared by a melt polymerization substantially in the presence of no solvent. The polyurethane is prepared, more preferably, by a continuous melt polymerization with a multi-screw extruder.

The polyurethane foam of the present invention can be produced by foaming the above-described thermoplastic polyurethane. Upon foaming, non-reactive gases are preferably employed as a foaming agent. Here, the non-reactive gas means a gas which is not reactive with a thermoplastic polyurethane or a component used for the preparation of a thermoplastic polyurethane. The non-reactive gases include, for example, nitrogen, carbon dioxide, argon and helium. Among them, carbon dioxide or nitrogen is preferable, from the viewpoint of the solubility to a thermoplastic polyurethane and the production cost of the polyurethane foam.

The polyurethane foam of the present invention can be produced by dissolving the above-described non-reactive gas in the above-described thermoplastic polyurethane under a pressurized condition, then releasing the pressure to effect the foaming of the polyurethane at a temperature of not less than the softening temperature thereof. From the viewpoint of producing a polyurethane foam having a uniform foam structure, the amount of the non-reactive gas dissolved in the thermoplastic polyurethane is desired to be the amount of saturation at the condition under which the dissolution is effected.

The use of a sheet-like molded product as the thermoplastic polyurethane for dissolving the non-reactive gas therein is advantageous in that the production of the foam having a uniform foam structure is easy, in that the step for making a polishing pad can be simplified, and in other respects. The preferred sheet-like molded products are the ones molded by means of extrusion molding machines such as a single screw extruder and a twin screw extruder, or an injection molding machine. The thickness of the sheet-like molded product preferably falls within the range of 0.8 to 5 mm from the viewpoint of the ease of producing the foam and the length of time required for dissolving the non-reactive gas therein.

Here, the process for producing a foamed article by dissolving a gas in a thermoplastic resin or a molded product thereof, and then reducing the pressure is disclosed in the U.S. Pat. No. 4,473,665, Japanese Patent Application Laid-open Nos. Hei 6-322168, Hei 8-11190, Hei 10-36547, 2000-169615 and 2000-248101, and the like. However, no specific example is known in which the process is applied for the production of the foam of the above-described specific thermoplastic polyurethane.

The polyurethane foam of the present invention can be produced by the process comprising dissolving a non-reactive gas in a molded product of the thermoplastic polyurethane under the conditions of a pressure of 3 to 15 MPa and a temperature of 50 to 160° C. in a pressure vessel, releasing the pressure of the pressure vessel at a temperature of lower than the softening temperature of the thermoplastic polyurethane, and heating the molded product to a temperature of not less than the softening temperature of the thermoplastic polyurethane to effect the foaming of the molded product [Production process 1].

Although depending on the composition of the thermoplastic polyurethane, the cell size of the resulting foam is determined by the amount of the non-reactive gas dissolved. The amount of the non-reactive gas dissolved can be controlled by the pressure and the temperature under which the dissolution is effected. When the pressure during the dissolution of the non-reactive gas is less than 3 MPa, a long time is required for dissolving the amount of saturation of the non-reactive gas in the molded product of the polyurethane. On the other hand, when the pressure during the dissolution of the non-reactive gas exceeds 15 MPa, the time required for dissolving the non-reactive gas is made short, but the cell size of the resulting foam becomes remarkably small because the amount of the gas dissolved grows larger than necessary. The pressure during the dissolution of the non-reactive gas preferably falls within the range of 5 to 14 MPa. Whereas, when the temperature during the dissolution of the non-reactive gas is less than 50° C., a long time is required for dissolving the amount of saturation of the non-reactive gas in the molded product of the polyurethane. On the other hand, when the temperature during the dissolution of the non-reactive gas exceeds 160° C., partial foaming occurs upon releasing the pressure of the pressure vessel, or the cell size of the resulting foam becomes too large because the amount of the non-reactive gas dissolved is remarkably small. The temperature during the dissolution of the non-reactive gas preferably falls within the range of 80 to 140° C.

When the temperature at which the molded product, in which the non-reactive gas is dissolved, is heated after the release of the pressure is less than the softening temperature of the polyurethane, the formation and the growth of the cells become insufficient. The temperature at which the molded product, in which the non-reactive gas is dissolved, is heated preferably falls within the range of (T+10)° C. to (T+40)° C., where T means the softening temperature of the polyurethane, from the viewpoint of the size of the resulting cell and the strength of the foam. The method for heating and foaming is not restricted. However, the method where a heat is uniformly applied to the molded product, in which the non-reactive gas is dissolved, is preferred from the viewpoint of ensuring the uniformity of the foam structure. Examples of the method for heating and foaming can include a method in which the molded product is allowed to pass through a heating medium such as hot water, a hot oil bath, hot air or water vapor.

Alternatively, the polyurethane foam of the present invention can be produced by the process comprising dissolving a non-reactive gas in a molded product of the thermoplastic polyurethane under the conditions of a pressure of 5 to 15 MPa and a temperature of 160 to 200° C. in a pressure vessel, and releasing the pressure of the pressure vessel to atmospheric pressure from the pressurized condition to effect the foaming of the molded product [Production process 2].

Although depending on the composition of the thermoplastic polyurethane, the cell size of the resulting foam is determined by the amount of the non-reactive gas dissolved. The amount of the non-reactive gas dissolved can be controlled by the pressure and the temperature under which the dissolution is effected. When the pressure during the dissolution of the non-reactive gas is less than 5 MPa, a long time is required for dissolving the amount of saturation of the non-reactive gas in the molded product of the polyurethane. On the other hand, when the pressure during the dissolution of the non-reactive gas exceeds 15 MPa, the time required for dissolving the non-reactive gas is made short, but the cell size of the resulting foam becomes remarkably small because the amount of the gas dissolved grows larger than necessary. The pressure during the dissolution of the non-reactive gas preferably falls within the range of 7 to 14 MPa. Whereas, when the temperature at which the dissolution of the non-reactive gas, the release of the pressure and the foaming of the molded product are effected is less than 160° C., a long time is required for dissolving the amount of saturation of the non-reactive gas in the molded product of the polyurethane. In addition, the formation and the growth of the cells become insufficient. On the other hand, when said temperature is higher than 200° C., variation of the size of the resulting cell and deformation of the resulting foam are observed. The temperature at which the foaming of the molded product is effected preferably falls within the range of (T+20)° C. to (T+50)° C., where T means the softening temperature of the polyurethane.

In addition, the polyurethane foam of the present invention can be produced by the process comprising dissolving a non-reactive gas in the thermoplastic polyurethane at a molten state under a pressurized condition and subjecting the resulting thermoplastic polyurethane to extrusion molding or injection molding [Production Processes 3 to 5].

With respect to these processes, the temperature for melting the thermoplastic polyurethane preferably falls within a range of 170 to 250° C. When the temperature for melting the thermoplastic polyurethane is less than 170° C., the polyurethane is not substantially plasticized, which may make it difficult to melt the thermoplastic polyurethane upon kneading with a screw in the cylinder of an extruder. On the other hand, when the temperature for melting the thermoplastic polyurethane exceeds 250° C., thermally decomposed products and unmelted matters such as gel-like matters may be formed. As a result, it may be difficult to produce a foam having a uniform foam structure. The temperature for melting the thermoplastic polyurethane preferably falls within the range of 180 to 240° C.

The pressure at the dissolution of the non-reactive gas in the thermoplastic polyurethane at a molten state falls within the range of preferably 3 to 20 MPa, and more preferably 5 to 18 MPa. When the pressure during the dissolution of the non-reactive gas is less than 3 MPa, the amount of the non-reactive gas dissolved in the polyurethane at a molten state is small and, therefore, it tends to become substantially difficult to produce a foam. On the other hand, when the pressure during the dissolution of the non-reactive gas exceeds 20 MPa, the cell size of the resulting foam may become too small.

In the case where the polyurethane foam is produced by extrusion molding, it is important to employ the conditions under which the thermoplastic polyurethane at a molten state and the non-reactive gas are mixed together in the cylinder of an extruder; the resulting mixture is kept unfoamed in the cylinder of an extruder and in the die; and the foaming is effected by the extrusion of the mixture into air from the die outlet. If the foaming is effected in the cylinder of an extruder or in the die, the size of the resulting cell may be large, which makes it difficult to produce a foam having a uniform and fine foam structure. Therefore, it is important to employ the conditions under which the non-reactive gas is introduced into the cylinder of an extruder, preferably into the mid-part of the cylinder, and the stock pressure is kept within the extent such that the foaming is not effected at the part between the die outlet, from which the thermoplastic polyurethane is extruded, and the site where the non-reactive gas is introduced. The stock pressure is preferably kept within the range of 3 to 20 MPa at the part between the die outlet and the site where the non-reactive gas is introduced. Further, if the viscosity of the thermoplastic polyurethane at a molten state, in which the non-reactive gas is dissolved, is low, when extruded from the die outlet, the resulting cells may be huge or broken. In order to produce a foam having a uniform and fine foam structure, it is preferably to employ the conditions under which the thermoplastic polyurethane at a molten state, in which the non-reactive gas is dissolved, can be substantially extruded. In the production process of the polyurethane foam of the present invention, the temperature of the polyurethane at the die outlet is preferably set within the range of 170 to 200° C. in order to produce a foam having a uniform and fine foam structure.

The polyurethane foam can be produced by common extrusion molding methods such as a T-die extrusion method, a profile extrusion method and a tube extrusion method. Among them, the T-die extrusion method is preferred because sheet-like molded products having a uniform thickness can be produced with ease.

In the case where the polyurethane foam is produced by injection molding, if the foaming is effected in the injection cylinder, the size of the resulting cell may be large, which makes it difficult to produce a foam having a uniform and fine foam structure. Therefore, it is important to employ the conditions under which the non-reactive gas is introduced into the injection cylinder, preferably into the mid-part of the cylinder, and the stock pressure is kept within the extent such that the foaming is not effected at the part between the injection nozzle and the site where the non-reactive gas is introduced. The stock pressure is preferably kept within the range of 3 to 20 MPa at the part between the injection nozzle and the site where the non-reactive gas is introduced.

As the method for the injection molding of the thermoplastic polyurethane at a molten state, in which the non-reactive gas is dissolved, following methods can be employed.

(1) A method in which the thermoplastic polyurethane at a molten state is injected in a mold under a low speed condition, under which the stock pressure is, during the injection, reduced to the pressure allowing the foaming, and a foam is produced in the mold simultaneously with the injection [Production Process 3];

(2) A method in which the thermoplastic polyurethane at a molten state is injected in a mold under a high speed condition, under which the stock pressure is, during the injection, kept to the extent such that the foaming is not effected; and cooled while keeping the stock pressure as above to give a unfoamed molded product; and then the molded product is subjected to the foaming by a heat treatment at a temperature of not less than the softening temperature of the thermoplastic polyurethane to give a foam [Production Process 4];

(3) A method in which the thermoplastic polyurethane at a molten state is injected in a mold under a high speed condition, under which the stock pressure is, during the injection, kept to the extent such that the foaming is not effected; and a foam is produced by increasing, after the injection, the mold cavity up to the size of an objective foam [Production method 5]; and so on.

Among these methods, in particular, the method in which a unfoamed molded product, obtained by injection under a high speed condition, is subjected to the foaming by a heat treatment [Production Process 4] is more preferred because a foam having a uniform foam structure can be produced with ease.

When the injection of the thermoplastic polyurethane at a molten state is carried out under the high speed condition [Production processes 4 and 5], the injection speed is preferably the speed such that the mold is filled with the thermoplastic polyurethane over 0.5 to 2.5 seconds. In addition, the temperature to which the unfoamed molded product is heated preferably falls within the range of 150 to 180° C.

On the other hand, when the injection of the thermoplastic polyurethane at a molten state is carried out under the low speed condition and a foam is produced in the mold simultaneously with the injection [Production process 3], the injection speed is preferably the speed such that the mold is filled with the thermoplastic polyurethane over 4 to 10 seconds.

The polishing pad of the present invention is produced by grinding or slicing the polyurethane foam obtained by the above-described manner, so that the cells are exposed to the surface. Furthermore, the resulting polishing pad can also be subjected to an additional processing such as setting in a prescribed shape, surface processing or lamination with a material serving as a cushion layer.

The polishing pad of the present invention can be used, together with a conventionally known polishing slurry, for chemical mechanical polishing, which may be abbreviated as "CMP". The polishing slurry contains, for example, liquid media such as water and oil; polishing agents such as aluminium oxide, cerium oxide, zirconium oxide and silicon carbide; bases; acids; and surfactants. In addition, for carrying out CMP, if required, the polishing slurry may also be used together with a lubricating oil, a cooling mixture, and the like. It is possible to carry out CMP by bringing the surface of the articles to be polished and the polishing pad into contact with each other under pressure, at a given speed, for a given period in the presence of the polishing slurry using a known apparatus for CMP. Although the articles to be polished are not particularly restricted, examples thereof may include rock crystal, silicon, glass, optical base, base for electronic circuit board, base for multilayer wiring board, hard disc and so on.

EXAMPLES

The present invention will be explained more specifically with reference to examples, but the present invention is not restricted at all to such examples.

In the following Examples, properties of the polyurethane and the polyurethane foam are measured according to the methods shown below.

[Density of the Foam]

The density of the polyurethane foam is measured according to JIS K-7112.

[Cell Size of the Foam]

A photograph of the cross section of the foam is taken by means of a scanning electron microscope [SEM]. Then, the number of cells present in a given area is counted to calculate the number of cells per unit volume, that is the cell density. The average cell size of the foam is calculated based on this cell density, the density of the foam measured above and the density of the thermoplastic polyurethane, granting that the cells have perfect spherical shape.

[Hardness]

Hardness [JIS-D hardness] of the thermoplastic polyurethane is measured according to JIS K-7311 using a sheet having a thickness of 2 mm prepared by injection molding.

Hardness [JIS-C hardness] of the polyurethane foam is measured according to JIS K-7311.

[Softening Temperature]

Vicat softening temperature is measured according to JIS K-7206 under the load of 9.8 N [1 kgf] using a sheet having a thickness of 2 mm prepared by injection molding and subjected to the heat treatment at 100° C. for 12 hours.

[Storage Elastic Modulus]

The storage elastic modulus at a specified temperature is measured with a viscoelastic measuring rheometer ["DVE Rheospectrer", trade name, made by Rheology Inc.] under a frequency of 11 Hz using a sheet having a thickness of 2 mm prepared by injection molding and subjected to the heat treatment at 90° C. for 5 hours.

[Melting Peak Temperature]

Melting peak temperature is measured under nitrogen and at a rate of temperature rise of 10° C./min with a differential scanning calorimeter ["DSC-30", trade name, made by Mettler tredo Co., Ltd.] using 10 mg of the thermoplastic polyurethane.

Referential Example 1

A poly(tetramethylene glycol) [abbreviated as "PTMG"] having a number average molecular weight of 650, 1,4-butanediol [abbreviated as "BD"] and 4,4'-diphenylmethanediisocyanate [abbreviated as "MDI"] were continuously fed, by constant delivery pumps, into a twin-screw extruder [30 mm ϕ, L/D=36, cylinder temperature: 75 to 260° C.] with two screws rotating in the same axial direction, wherein the feed rate of the total weight of the PTMG, the MDI and the BD was 300 g/min and the molar ratio of them was PTMG/MDI/BD=1/7.5/6.5 [content of nitrogen atom: 6.9% by weight], and subjected to continuous melt polymerization to give a thermoplastic polyurethane. The melt of the thermoplastic polyurethane produced was continuously extruded into water as a strand. The resulting polyurethane strands were cut in pellets with a pelletizer. The resulting pellets were dried at 95° C. for 20 hours to give a thermoplastic polyurethane having a hardness [JIS-D hardness] of 80, a softening temperature of 140° C. and a melting peak temperature of 190° C. This polyurethane is referred to as "PU-1". Storage elastic modulus of the PU-1 measured at 50° C. [$E'_{50}$] was $1.6\times10^{10}$ dyn/cm$^2$, and that measured at 0° C. [$E'_0$] was $2.0\times10^{10}$ dyn/cm$^2$. Ratio of them [$E'_0/E'_{50}$] was 1.25.

Referential Example 2

Procedures of the Referential Example 1 were repeated, except that a poly(3-methylpentanediol adipate) [abbreviated as "PMPA"] having a number average molecular weight of 500, 1,4-butanediol [BD] and 4,4'-diphenylmethanediisocyanate [MDI] were continuously fed into a twin-screw extruder in the molar ratio of PMPA/MDI/BD=1/4.5/3.5 [content of nitrogen atom: 6.5% by weight], to give a thermoplastic polyurethane having a hardness [JIS-D hardness] of 83, a softening temperature of 140° C. and a melting peak temperature of 160° C. This polyurethane is referred to as "PU-2". Storage elastic modulus of the PU-2 measured at 50° C. [$E'_{50}$] was $1.5\times10^{10}$ dyn/cm$^2$, and that measured at 0° C. [$E'_0$] was $1.95\times10^{10}$ dyn/cm$^2$. Ratio of them [$E'_0/E'_{50}$] was 1.3.

Referential Example 3

Procedures of the Referential Example 1 were repeated, except that a poly(3-methylpentanediol adipate) [PMPA] having a number average molecular weight of 1,000, 1,4-butanediol [BD] and 4,4'-diphenylmethanediisocyanate [MDI] were continuously fed into a twin-screw extruder in the molar ratio of PMPA/MDI/BD=1/7.1/6.1 [content of nitrogen atom: 6.0% by weight], to give a thermoplastic polyurethane having a hardness [JIS-D hardness] of 81, a softening temperature of 145° C. and a melting peak temperature of 190° C. This polyurethane is referred to as "PU-3". Storage elastic modulus of the PU-3 measured at 50° C. [$E'_{50}$] was $1.6\times10^{10}$ dyn/cm$^2$, and that measured at 0° C. [$E'_0$] was $2.0\times10^{10}$ dyn/cm$^2$. Ratio of them [$E'_0/E'_{50}$] was 1.25.

Referential Example 4

Procedures of the Referential Example 1 were repeated, except that a poly(3-methylpentanediol adipate) [PMPA] having a number average molecular weight of 1,500, 1,4-butanediol [BD] and 4,4'-diphenylmethanediisocyanate [MDI] were continuously fed into a twin-screw extruder in the molar ratio of PMPA/MDI/BD=1/5.5/4.5 [content of nitrogen atom: 4.7% by weight], to give a thermoplastic polyurethane having a hardness [JIS-D hardness] of 53, a softening temperature of 125° C. and a melting peak temperature of 190° C. This polyurethane is referred to as "PU-4". Storage elastic modulus of the PU-4 measured at 50° C. [$E'_{50}$] was $7.3\times10^8$ dyn/cm$^2$, and that measured at 0° C. [$E'_0$] was $1.1\times10^{10}$ dyn/cm$^2$. Ratio of them [$E'_0/E'_{50}$] was 15.0.

Example 1

A thermoplastic polyurethane [PU-1] was charged in a single-screw extruder [65 mm ϕ], extruded from a T-die under the conditions of a cylinder temperature of 215 to 225° C. and a die temperature of 225° C., and allowed to pass between a pair of rolls spaced from each other with a gap of 1.8 mm, the temperature of which was adjusted to 60° C., to give a sheet having a thickness of 2 mm. Then, the resulting sheet, cut in a size of 5 cm×10 cm, was placed in a pressure vessel, and carbon dioxide was dissolved in the sheet under the conditions of a temperature of 130° C. and a pressure of 7 MPa for 5 hours to give a sheet containing 1.4% by weight, which is the amount of saturation, of carbon dioxide. After cooled to room temperature, the pressure of the pressure vessel was reduced to atmospheric pressure. Then, the resulting sheet was taken out from the pressure vessel and immersed in a silicon oil of 160° C. for 3 minutes. After that, the sheet was taken out from the silicon oil and cooled to room temperature to give a foam. The resulting foam had a density of 0.75 g/cm$^3$, a cell size of 20 to 60 $\mu$m and a hardness [JIS-C hardness] of 97.

The resulting foam [sheet-like article] was formulated into a polishing pad by grinding the surface thereof, by which the cells were exposed to the surface.

Example 2

A thermoplastic polyurethane [PU-2] was charged in a single-screw extruder [65 mm $\phi$], extruded from a T-die under the conditions of a cylinder temperature of 215 to 225° C. and a die temperature of 225° C., and allowed to pass between a pair of rolls spaced from each other with a gap of 1.8 mm, the temperature of which was adjusted to 60° C., to give a sheet having a thickness of 2 mm. Then, the resulting sheet, cut in a size of 5 cm×10 cm, was placed in a pressure vessel, and carbon dioxide was dissolved in the sheet under the conditions of a temperature of 130° C. and a pressure of 8 MPa for 5 hours to give a sheet containing 2% by weight, which is the amount of saturation, of carbon dioxide. After cooled to room temperature, the pressure of the pressure vessel was reduced to atmospheric pressure. Then, the resulting sheet was taken out from the pressure vessel and immersed in a silicon oil of 160° C. for 3 minutes. After that, the sheet was taken out from the silicon oil and cooled to room temperature to give a foam. The resulting foam had a density of 0.80 g/cm$^3$, a cell size of 40 to 80 $\mu$m and a hardness [JIS-C hardness] of 99.

The resulting foam [sheet-like article] was formulated into a polishing pad by grinding the surface thereof, by which the cells were exposed to the surface, followed by the formation of a groove in a lattice pattern.

Example 3

A thermoplastic polyurethane [PU-3] was charged in a single-screw extruder [65 mm $\phi$], extruded from a T-die under the conditions of a cylinder temperature of 215 to 225° C. and a die temperature of 225° C., and allowed to pass between a pair of rolls spaced from each other with a gap of 1.8 mm, the temperature of which was adjusted to 60° C., to give a sheet having a thickness of 2 mm. Then, the resulting sheet, cut in a size of 5 cm×10 cm, was placed in a pressure vessel, and carbon dioxide was dissolved in the sheet under the conditions of a temperature of 140° C. and a pressure of 7 MPa for 5 hours to give a sheet containing 1.2% by weight, which is the amount of saturation, of carbon dioxide. After cooled to room temperature, the pressure of the pressure vessel was reduced to atmospheric pressure. Then, the resulting sheet was taken out from the pressure vessel and immersed in a silicon oil of 160° C. for 3 minutes. After that, the sheet was taken out from the silicon oil and cooled to room temperature to give a foam. The resulting foam had a density of 0.78 g/cm$^3$, a cell size of 30 to 80 $\mu$m and a hardness [JIS-C hardness] of 99.

Example 4

A thermoplastic polyurethane [PU-2] was charged in a injection molding machine and formulated into a sheet having a thickness of 2 mm under the conditions of a cylinder temperature of 215 to 225° C., a nozzle temperature of 225° C. and a mold temperature of 50° C. Then, the resulting sheet, cut in a size of 5 cm×10 cm, was placed in a pressure vessel, and carbon dioxide was dissolved in the sheet under the conditions of a temperature of 130° C. and a pressure of 8 MPa for 5 hours to give a sheet containing 1.9% by weight, which is the amount of saturation, of carbon dioxide. After cooled to room temperature, the pressure of the pressure vessel was reduced to atmospheric pressure. Then, the resulting sheet was taken out from the pressure vessel and immersed in a silicon oil of 160° C. for 3 minutes. After that, the sheet was taken out from the silicon oil and cooled to room temperature to give a foam. The resulting foam had a density of 0.80 g/cm$^3$, a cell size of 50 to 90 $\mu$m and a hardness [JIS-C hardness] of 99.

Comparative Example 1

A thermoplastic polyurethane [PU-4] was charged in a single-screw extruder [65 mm $\phi$], extruded from a T-die under the conditions of a cylinder temperature of 180 to 210° C. and a die temperature of 210° C., and allowed to pass between a pair of rolls spaced from each other with a gap of 1.8 mm, the temperature of which was adjusted to 60° C., to give a sheet having a thickness of 2 mm. Then, the resulting sheet, cut in a size of 5 cm×10 cm, was placed in a pressure vessel, and carbon dioxide was dissolved in the sheet under the conditions of a temperature of 50° C. and a pressure of 8 MPa for 5 hours to give a sheet containing 7.5% by weight, which is the amount of saturation, of carbon dioxide. After cooled to room temperature, the pressure of the pressure vessel was reduced to atmospheric pressure. Then, the resulting sheet was taken out from the pressure vessel and immersed in a silicon oil of 140° C. for 3 minutes. After that, the sheet was taken out from the silicon oil and cooled to room temperature to give a foam. The resulting foam had a density of 0.70 g/cm$^3$, a cell size of 20 to 40 $\mu$m and a hardness [JIS-C hardness] of 38.

Example 5

A thermoplastic polyurethane [PU-1] was charged in a single-screw extruder [65 mm $\phi$], extruded from a T-die under the conditions of a cylinder temperature of 215 to 225° C. and a die temperature of 225° C., and allowed to pass between a pair of rolls spaced from each other with a gap of 1.8 mm, the temperature of which was adjusted to 60° C., to give a sheet having a thickness of 2 mm. Then, the resulting sheet, cut in a size of 5 cm×10 cm, was placed in a pressure vessel, and carbon dioxide was dissolved in the sheet under the conditions of a temperature of 160° C. and a pressure of 7 MPa for 5 hours. After that, while keeping the temperature at 160° C., the pressure of the pressure vessel was reduced to atmospheric pressure over 10 minutes to give a foam. The resulting foam had a density of 0.75 g/cm$^3$, a cell size of 20 to 60 $\mu$m and a hardness [JIS-C hardness] of 97.

Example 6

A thermoplastic polyurethane [PU-1] was supplied to a single screw extruder [50 mm $\phi$, L/D=28]. It was molten at a cylinder temperature of 210 to 225° C., and simultaneously, carbon dioxide was introduced into the mid-part of the cylinder at a pressure of 15 MPa. After kneading, the kneaded mixture was extruded from a T-die having a width of 40 cm, the temperature of which was adjusted to 180° C., and allowed to pass between a pair of rolls spaced from each other with a gap of 1.8 mm, the temperature of which was adjusted to 60° C. Thus, the foaming was carried out simultaneously with the molding to give a foamed sheet having a thickness of 2 mm. The take-off speed of the sheet was 0.5 m/min. The resulting foam had a density of 0.75 g/cm$^3$, a cell size of 20 to 60 μm and a hardness [JIS-C hardness] of 97.

The resulting foam [sheet-like article] was formulated into a polishing pad by grinding the surface thereof, by which the cells were exposed to the surface.

Example 7

A thermoplastic polyurethane [PU-2] was supplied to a single screw extruder [50 mm φ, L/D =28]. It was molten at a cylinder temperature of 210 to 225° C., and simultaneously, carbon dioxide was introduced into the mid-part of the cylinder at a pressure of 10 MPa. After kneading, the kneaded mixture was extruded from a T-die having a width of 40 cm, the temperature of which was adjusted to 180° C., and allowed to pass between a pair of rolls spaced from each other with a gap of 1.8 mm, the temperature of which was adjusted to 60° C., to give a foamed sheet having a thickness of 2 mm. The take-off speed of the sheet was 0.5 m/min. The resulting foam had a density of 0.80 g/cm$^3$, a cell size of 40 to 80 μm and a hardness [JIS-C hardness] of 99.

Example 8

A thermoplastic polyurethane [PU-3] was supplied to a single screw extruder [50 mm φ, L/D =28]. It was molten at a cylinder temperature of 210 to 225° C., and simultaneously, carbon dioxide was introduced into the mid-part of the cylinder at a pressure of 8 MPa. After kneading, the kneaded mixture was extruded from a T-die having a width of 40 cm, the temperature of which was adjusted to 180° C., and allowed to pass between a pair of rolls spaced from each other with a gap of 1.8 mm, the temperature of which was adjusted to 60° C., to give a foamed sheet having a thickness of 2 mm. The take-off speed of the sheet was 0.5 m/min. The resulting foam had a density of 0.78 g/cm$^3$, a cell size of 30 to 80 μm and a hardness [JIS-C hardness] of 99.

Comparative Example 2

A thermoplastic polyurethane [PU-4] was supplied to a single screw extruder [50 mm φ, L/D=28]. It was molten at a cylinder temperature of 210 to 225° C., and simultaneously, carbon dioxide was introduced into the mid-part of the cylinder at a pressure of 15 MPa. After kneading, the kneaded mixture was extruded from a T-die having a width of 40 cm, the temperature of which was adjusted to 180° C., and allowed to pass between a pair of rolls spaced from each other with a gap of 1.8 mm, the temperature of which was adjusted to 60° C., to give a foamed sheet having a thickness of 2 mm. The take-off speed of the sheet was 0.5 m/min. The resulting foam had a density of 0.70 g/cm$^3$, a cell size of 20 to 40 μm and a hardness [JIS-C hardness] of 38.

Example 9

A thermoplastic polyurethane [PU-2] was supplied to an injection molding machine. It was molten at a cylinder temperature of 210 to 225° C., and simultaneously, carbon dioxide was introduced into the mid-part of the cylinder at a pressure of 10 MPa. After kneading, the kneaded mixture was injected into a mold, the temperature of which was adjusted to 50° C., at a speed of 40 cm$^3$/sec, wherein it took 1.25 seconds to fill the mold. After cooled to room temperature, the mold was opened to release the unfoamed sheet having a thickness of 2 mm. Then, the resulting sheet was immersed in a silicon oil of 160° C. for 3 minutes. After that, the sheet was taken out from the silicon oil and cooled to room temperature to give a foam. The resulting foam had a density of 0.80 g/cm$^3$, a cell size of 50 to 90 μm and a hardness [JIS-C hardness] of 99.

INDUSTRIAL APPLICABILITY

In accordance with the present invention, there are provided a polyurethane foam having a uniform foam structure and a process for production thereof, and a polishing pad made of the foam. The polishing pad of the present invention is useful for chemical mechanical polishing, and can be used for the purpose of polishing a semiconductor wafer or the like with high accuracy and high efficiency. The polishing pad of the present invention can achieve the improvements in the flatness of the surface of polished materials and in the planarization efficiency, and can extend the polishing pad life longer than that of the conventional polishing pads.

The foam of the present invention can show a uniform polishing performance even when formulated into a large polishing pad, because it has a uniform foam structure. Further, it can also polish a plurality of articles simultaneously, when formulated into a large polishing pad. In addition, in such a case, there are less variations in quality between the resulting articles after polishing. Thus, the foam of the present invention also contributes to the improvement of the productivity of the articles obtained by the polishing utilizing CMP, such as semiconductors.

What is claimed is:

1. A polyurethane foam having a density of 0.5 to 1.0 g/cm$^3$, a cell size of 5 to 200 μm and a hardness [JIS-C hardness] of not less than 90, comprising a thermoplastic polyurethane which is prepared by a reaction of a high polymer diol, an organic diisocyanate and a chain extender, wherein the thermoplastic polyurethane contains not less than 6% by weight of a nitrogen atom derived from the isocyanate group, and has a storage elastic modulus measured at 50° C. [E'$_{50}$] of not less than 5×10$^9$ dyn/cm$^2$.

2. A polyurethane foam having a density of 0.5 to 1.0 g/cm$^3$ and a cell size of 5 to 200 μm, prepared by dissolving a non-reactive gas, under a pressurized condition, in a thermoplastic polyurethane which is prepared by a reaction of a high polymer diol, an organic diisocyanate and a chain extender, and the thermoplastic polyurethane contains not less than 6% by weight of a nitrogen atom derived from the isocyanate group, and has a storage elastic modulus measured at 50° C. [E'$_{50}$] of not less than 5×10$^9$ dyn/cm$^2$; then releasing the pressure to effect the foaming of the polyurethane at a temperature of not less than the softening temperature thereof.

3. The foam according to claim 2, wherein the thermoplastic polyurethane in which the non-reactive gas is dissolved is a thermoplastic polyurethane at a molten state.

4. The foam according to claim 2, wherein the non-reactive gas is carbon dioxide or nitrogen.

5. The foam according to claim 1, wherein the ratio [E'$_0$/E'$_{50}$] of the storage elastic modulus of the thermoplastic polyurethane measured at 0° C. [E'$_0$] based on the storage elastic modulus measured at 50° C. [E'$_{50}$] is not more than 1.8.

6. The foam according to claim 1, wherein the thermoplastic polyurethane has a melting peak temperature which is not more than 200° C.

7. A polishing pad comprising:
the foam according to claim 1.

8. A chemical mechanical polishing process comprising:
polishing a substrate with the foam as claimed in claim 1.

9. A process for producing a polyurethane foam, comprising:
dissolving a non-reactive gas in a molded product made of a thermoplastic polyurethane which is prepared by a reaction of a high polymer diol, an organic diisocyanate and a chain extender, wherein the thermoplastic polyurethane contains not less than 6% by weight of a nitrogen atom derived from the isocyanate group, and has a storage elastic modulus measured at 50° C. [$E'_{50}$] of not less than $5 \times 10^9$ dyn/cm$^2$, under the conditions of a pressure of 3 to 15 MPa and a temperature of 50 to 160° C. in a pressure vessel;
releasing the pressure of the pressure vessel at a temperature of lower than the softening temperature of the thermoplastic polyurethane; and
heating the molded product, in which the non-reactive gas is dissolved, to a temperature of not less than the softening temperature of the thermoplastic polyurethane to effect the foaming of the molded product.

10. A process for producing a polyurethane foam, comprising:
dissolving a non-reactive gas in a molded product made of a thermoplastic polyurethane which is prepared by a reaction of a high polymer diol, an organic diisocyanate and a chain extender, wherein the thermoplastic polyurethane contains not less than 6% by weight of a nitrogen atom derived from the isocyanate group, and has a storage elastic modulus measured at 50° C. [$E'_{50}$] of not less than $5 \times 10^9$ dyn/cm$^2$, under the conditions of a pressure of 3 to 15 MPa and a temperature of 160 to 200° C. in a pressure vessel; and
releasing the pressure of the pressure vessel to effect the foaming of the molded product, in which the non-reactive gas is dissolved.

11. A process for producing a polyurethane foam, comprising:
dissolving a non-reactive gas in a thermoplastic polyurethane which is prepared by a reaction of a high polymer diol, an organic diisocyanate and a chain extender, wherein the thermoplastic polyurethane contains not less than 6% by weight of a nitrogen atom derived from the isocyanate group, and has a storage elastic modulus measured at 50° C. [$E'_{50}$] of not less than $5 \times 10^9$ dyn/cm$^2$, at a molten state under a pressurized condition; and
subjecting the thermoplastic polyurethane, in which the non-reactive gas is dissolved, to extrusion molding or injection molding under a stock pressure allowing the foaming of said polyurethane to give a foamed molded product;
wherein the polyurethane foam has a density of 0.5 to 1.0 g/cm$^3$ and a cell size of 5 to 200 μm.

12. A process for producing a polyurethane foam, comprising:
dissolving a non-reactive gas in a thermoplastic polyurethane which is prepared by a reaction of a high polymer diol, an organic diisocyanate and a chain extender, wherein the thermoplastic polyurethane contains not less than 6% by weight of a nitrogen atom derived from the isocyanate group, and has a storage elastic modulus measured at 50° C. [$E'_{50}$] of not less than $5 \times 10^9$ dyn/cm$^2$, at a molten state under a pressurized condition;
subjecting the thermoplastic polyurethane, in which the non-reactive gas is dissolved, to injection molding at a speed such that a stock pressure can be kept within the range under which the foaming of the thermoplastic polyurethane is not effected, to give a unfoamed molded product; and heating the unfoamed molded product to a temperature of not less than the softening temperature of the thermoplastic polyurethane to effect the foaming of the molded product;
wherein said polyurethane foam has a density of 0.5 to 1.0 g/cm$^3$ and a cell size of 5 to 200 μm.

13. A process for producing a polyurethane foam, comprising:
dissolving a non-reactive gas in a thermoplastic polyurethane which is prepared by a reaction of a high polymer diol, an organic diisocyanate and a chain extender, wherein the thermoplastic polyurethane contains not less than 6% by weight of a nitrogen atom derived from the isocyanate group, and has a storage elastic modulus measured at 50° C. [$E'_{50}$] of not less than $5 \times 10^9$ dyn/cm$^2$, at a molten state under a pressurized condition;
injecting the thermoplastic polyurethane, in which the non-reactive gas is dissolved, into a mold at a speed such that a stock pressure can be kept within the range under which the foaming of the thermoplastic polyurethane is not effected; and increasing the mold cavity to give a foamed molded product;
wherein said polyurethane foam has a density of 0.5 to 1.0 g/cm$^3$ and a cell size of 5 to 200 μm.

14. The process for producing a polyurethane foam according to claim 9, wherein the ratio [$E'_0/E'_{50}$] of the storage elastic modulus of the thermoplastic polyurethane measured at 0° C. [$E'_0$] based on the storage elastic modulus measured at 50° C. [$E'_{50}$] is not more than 1.8.

15. The process for producing a polyurethane foam according to claim 9, wherein the thermoplastic polyurethane has a melting peak temperature which is not more than 200° C.

16. The process for producing a polyurethane foam according to claim 9, wherein the non-reactive gas is carbon dioxide or nitrogen.

* * * * *